United States Patent [19]

Kokubo

[11] 4,320,008
[45] Mar. 16, 1982

[54] APPARATUS FOR SEPARATING AND CONVEYING OF ANIMAL HOUSE WASTE MATERIALS

[76] Inventor: Fumiyuki Kokubo, 542 Ohaza Tsuzuranuki, Moroyamacho, Iruma-gun, Saitama-ken, Japan

[21] Appl. No.: 91,973

[22] Filed: Nov. 7, 1979

[51] Int. Cl.³ ............................................. B01D 21/12
[52] U.S. Cl. ..................................... 210/527; 119/22; 198/746; 198/748
[58] Field of Search ............... 198/748, 747, 746, 601; 119/22, 28; 210/523, 525, 526, 527

[56] References Cited

U.S. PATENT DOCUMENTS

| | | | |
|---|---|---|---|
| 3,240,323 | 3/1966 | Kitson | 198/601 |
| 3,409,120 | 11/1968 | Van Huis | 198/746 |
| 3,456,779 | 7/1969 | Andreae | 198/749 |
| 3,458,029 | 7/1969 | Allen et al. | 198/746 |
| 3,530,832 | 9/1970 | Satnick | 198/748 |
| 3,774,754 | 11/1973 | Hedlund | 198/746 |
| 3,799,329 | 3/1974 | Fitzpatrick | 198/747 |
| 3,827,402 | 8/1974 | Laurenz | 119/28 |
| 4,190,147 | 2/1980 | Hansson | 198/746 |

Primary Examiner—Theodore A. Granger
Attorney, Agent, or Firm—Burd, Bartz & Gutenkauf

[57] ABSTRACT

An apparatus for moving solid material and liquid from a floor into a solid material tank and a liquid tank. The floor has longitudinal sections that slope downwardly to a longitudinal slit open to a chamber located below the floor. A scraper pivotally connected to a frame moves solid material from the floor into the solid material tank when the frame is moved toward the solid material tank. A vertical plate attached to the frame extends through the slit into the chamber. A plate pivotally attached to the vertical plate pushes liquid in the chamber into the liquid tank when the frame is moved toward the liquid tank. A winch and rope attached to a connecting fitting located in a mount on the frame selectively moves the frame in opposite directions over the floor. The fitting has limited movement relative to the frame and engages the scraper to raise the scraper above the floor when the frame is moved toward the liquid tank whereby solid material is not moved when the scraper is raised.

24 Claims, 4 Drawing Figures

APPARATUS FOR SEPARATING AND CONVEYING OF ANIMAL HOUSE WASTE MATERIALS

BACKGROUND OF INVENTION

It is desirable to clean animal houses, such as hog and cow barns, by removing animal wastes for hygienic control. Mechanical material removing devices are used to move animal waste along floors and gutters to material collection or holding areas. These devices do not isolate solid matter from liquid. Animal liquid and solid matter are not thoroughly mixed on the receiving floor surface with the result that the solid matter solidifies and clogs liquid flow. Thus discharging difficulty and insufficient isolation would be induced, and such disorders are usually occurring at present. Under such circumstances, this invention offers the equipment to be able to solve the above defects, being constructed easily, with easier cleaning and maintenance, and smoother isolation and excretion or discharge of solid matters and liquid separately.

SUMMARY OF INVENTION

The invention is directed to an apparatus for separately removing solid material and liquid from a solid material and liquid receiving area and depositing the solid material and liquid into separate receivers. More particularly, the apparatus is used to remove animal waste, liquid and solids, located on a receiving floor into a solid material holding tank and a liquid holding tank. The floor has downwardly converging or sloping longitudinal floor sections separated from each other with a longitudinal center slit. The slit is open to a chamber or a way for accommodating liquid. The way is located below the level of the floor so that the liquid discharged onto the floor flows down the inclined or sloping floor sections, through the slit, and into the way chamber.

The apparatus has a frame supported on outside longitudinal side portions of the floor for movement along the longitudinal length of the floor. Solid material is moved along the floor in one direction with a scraper means having a blade. The blade has forward converging portions that engage the floor sections and a rear portion located above the floor. Pivot means pivotally connect the rear portion of the scraper means to the frame whereby the forward converging portions of the scraper means are movable toward and away from the floor. Connecting means mounted on the frame are attached to rope means pulled by a winch. Guide means on the frame are associated with the connecting means to allow the connecting means to have limited longitudinal movement relative to the frame.

A vertical first plate attached to the frame projects downwardly through the slit into the way chamber. A second plate located in the way chamber is pivotally mounted on the first plate for movement between a down liquid pushing position and an up non-liquid pushing position. The second plate, when in its first position, extends downwardly into engagement with the way in a direction opposite the scraper means.

When the rope is pulled in a first direction, the connecting means moves a limited amount relative to the guide on the frame to release the scraper means allowing it to pivot down into engagement with the floor. The frame and scraper means then move together along the floor pushing solid material into a solid material receiving area or tank located at one end of the floor. The vertical first plate extended through the slit clears the slit allowing liquid to flow through the slit into the way chamber. The second plate is in its up position and does not push the liquid in the way chamber. When the rope is pulled in the opposite direction, the connecting means engages a part of the scraper means to pivot the scraper means out of engagement with the floor. Movement of the scraper means in the second direction does not push the solid material along the floor. The second plate pivots down to push the liquid in the way to a liquid receiving area or tank located at the other end of the floor.

IN THE DRAWINGS

DESCRIPTION OF PREFERRED EMBODIMENT

Figure 1:
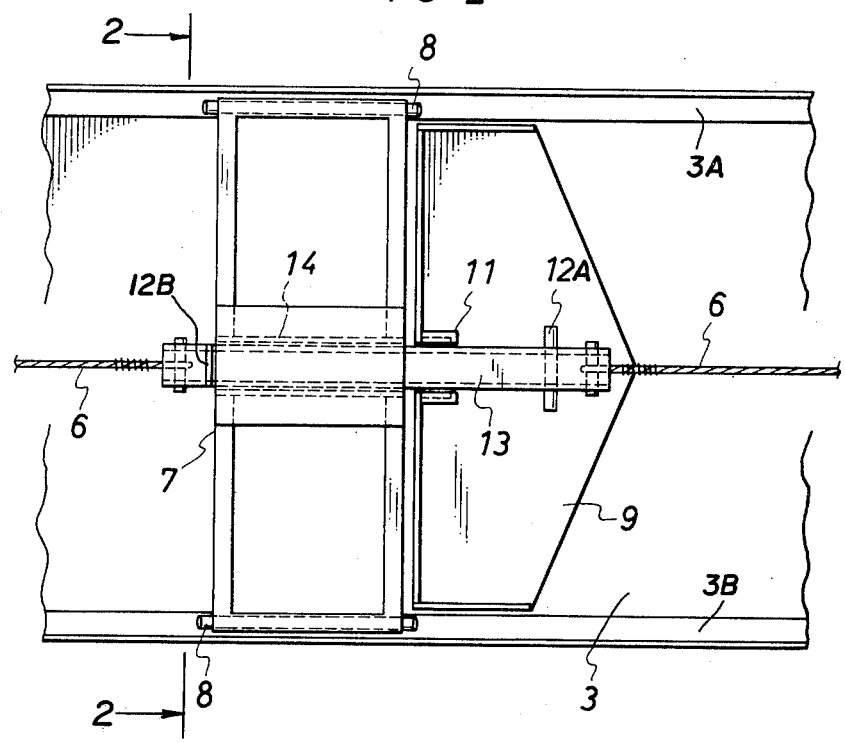
FIG. 1 is a top plan view of a liquid and solid material handling apparatus of the invention.
Figure 4:
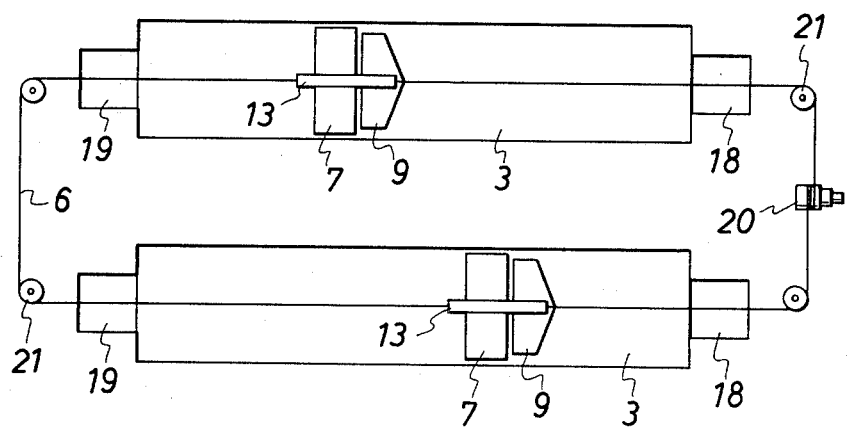
FIG. 4 is a diagrammatic plan view of a liquid and solid material handling system having two liquid and solid material handling apparatuses of the invention.

Referring to FIG. 1, a pair of basic concrete walls 1 of an animal house supports a hurdle-shaped stepping plate 2. A material-receiving floor 3 is located under plate 2. Floor 3 has a pair of longitudinal bottom sections that slope inwardly or have a falling gradient toward the center of the floor. A way 5 having a chamber for carrying liquid is located below and along the center of floor 3. The upper edges of way 5 are joined to the center of floor 3. The center of floor 3 and the top of way 5 have a narrow slit 4 providing a longitudinal passage into the chamber of way 5 so that liquid on floor 3 flows through slit 4 into the chamber of way 5. As shown in FIG. 4, a solid material-receiving tank 18 is located at the right end of floor 3. A liquid-receiving tank 19 is located at the left end of floor 3.

Returning to FIGS. 1 and 2, a moving frame 7 extends transversely over floor 3. Sleighs 8 secured to the lower sides of both ends of frame 7 slidably engage floor sides or shoulders 3A and 3B. The sleighs 8 slidably support frame 7 on floor sides 3A and 3B whereby the frame 7 can be moved along the longitudinal length of floor 3. The center section of frame 7 carries a downwardly directed plate 15 that extends through slit 4 into the chamber of way 5. A raking plate 16 is pivotally mounted with a pivot 17 to the lower end of plate 15. Plate 16 slants downwardly to the left in FIG. 3 and rests on way 5. Plate 16 can pivot to an upward generally horizontal position, as shown in broken lines in FIG. 3.

Figure 2:
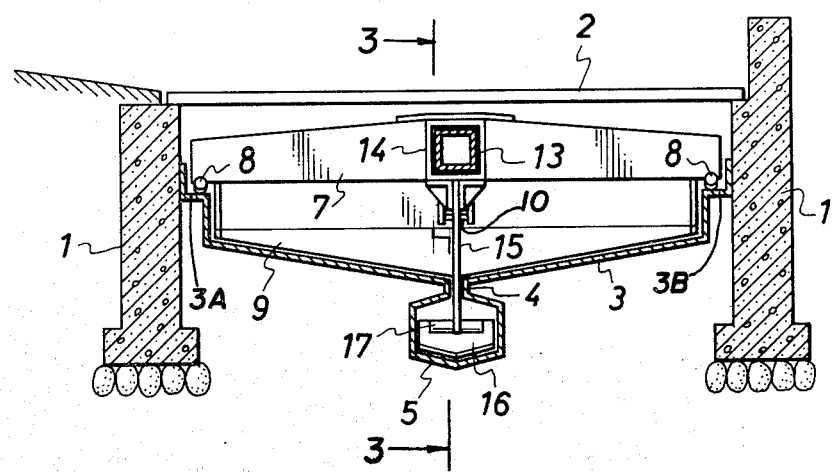
FIG. 2 is an enlarged sectional view taken along the line 2—2 of FIG. 1.

A scraper 9 extends transversely across floor 3 in front of frame 7. Scraper 9 is pivotally mounted with pivot 10 to the center or mid-part of frame 7. Scraper 9, as shown in FIG. 1, has a forward edge that converges in a forward direction to a center point. As shown in FIG. 2, the forward edges of scraper 9 are slidably located on the sloping surfaces of floor 3 with the pointed forward portion in vertical alignment with the slit 4. The pivot 10 permits scraper 9 to be freely moved to an elevated position, as shown in broken lines in FIG. 3, away from floor 3. Normally, the weight of scraper 9 inclines the scraper downwardly to the right, as shown in FIG. 3, with the forward edge slidably engaging floor 3.

DESCRIPTION OF PREFERRED EMBODIMENT

A connecting fitting 13 freely slides through a guide 14 mounted on the center of the top of frame 7. Connecting fitting 13 has limited sliding movement relative to guide 14 by the use of pin 12A and stop 12B on fitting 13. A raising guide 11 is mounted on the top of the base or frame end of scraper 9. Guide 11 extends upwardly adjacent the opposite sides of fitting 13. A transverse raising pin 12A extends through fitting 13 and is adapted to engage the guide 11 to pivot scraper 9 in an upward direction when the guide 11 is moved to the left, as viewed in FIGS. 1 and 3. This raises scraper 9 to the generally horizontal position, as shown in broken lines in FIG. 3, separating scraper 9 from floor 3. The raised position of scraper 9 is maintained as long as fitting 13 is in the left position.

Figure 3:
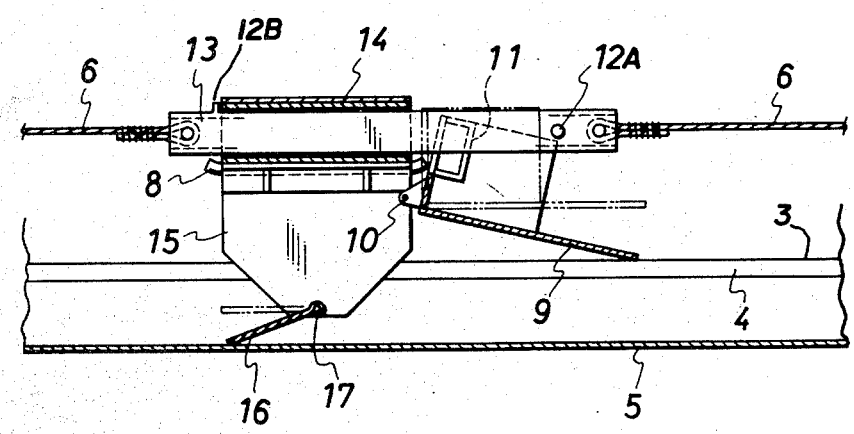
FIG. 3 is a sectional view taken along the line 3—3 of FIG. 2.

As shown in FIGS. 1 and 3, a cable 6 is connected to the opposite ends of connecting fitting 13. Cable 6 is located in a coiled or wrapped relation with a winch 20. Winch 20 is operable to move the cable 6 in opposite directions. The cable 6 is trained about rollers or pulleys 21 which guide the cable 6 along the center line of the floor 3.

In use, when rope 6 is pulled to the right, as viewed in FIGS. 1 and 3, connecting fitting 13 moves to the right. This releases pin 12A from guide 11 so that scraper 9 is free to move to its lowered or scraping position by its weight in engagement with floor 3.

As shown in FIG. 3, scraper 9 slopes downwardly and forwardly from pivot 10. The forward edge of scraper 9 is in engagement with floor 3. The scraper on movement of frame 7 to the right collects the solid material or matter on floor 3. The solid matter is strongly exfoliated and moved to the right into a solid material receiving tank 18. The connecting fitting 13 moves frame 7 to the right. The vertical plate 15 extended through slit 4 clears the slit of solid material. The raking plate 16 being pivotally mounted by pivot 17 to plate 15 is moved in an upward direction by liquid in the chamber of way 5 so that the discharge of liquid into tank 18 hardly occurs, as the liquid is in a condensed or mixed state with the solid material in way 5.

When rope 6 is pulled to the left by winch 20, initially the connecting fitting 13 slides left relative to guide 14. The pin 12A hits guide 11 and pivots plate 9 in an upward direction away from floor 3.

Scraper 9 is pivoted upwards to a generally horizontal up position, as shown in dotted lines in FIG. 3, to locate the forward edges of scraper 9 above floor 3. Scraper 9 in its up position is in an inactive state. When frame 7 is moved in a left direction, plate 16 pivots downwardly into engagement with way 5. The liquid in the chamber of way 5 is moved in a leftward direction and discharged into liquid-receiving tank 19.

The vertical plate 15, extending through slit 4 clears the slit of clogged solid material thereby allowing any liquid material accumulated above the slit to drain into the chamber of way 5.

Referring to FIG. 4, there is shown a liquid and solid material handling system having a pair of liquid and material handling apparatuses of the invention connected to a common rope 6. Rope 6 cooperates with a winch 20 to reciprocate the apparatuses in opposite directions along separate floors 3. The liquid and solid material apparatuses are reciprocated in opposite directions along their respective floors to move the solid matter into the tanks 18 and the liquid matter into the liquid-receiving tanks 19.

During movement of frame 7 and blade 9 in the reverse or left direction, blade 9 is separated from floor 3. The frame 7 and blade 9 smoothly slide along floor 3 without disturbing or setting aside the solid matter thereon. The reciprocating movement of the frame 7 relative to the floor 3 cleans the whole length of the slit as plate 15 projects through slit 4 into the chamber of way 5. The movement of the solid material by blade 9 in a forward direction into the solid material receiving tank 18 and the separate reverse movement of the frame 7 with the blade 9 in the raised position to move the liquid in the channel of way 5 to the liquid receiving tank 19 is a smooth operation, which is accomplished with rather a small amount of power; for example, about half the power requirements of a scraper that simultaneously moves liquid and solid material into a receiving floor. The solid material is completely separated or taken out from the liquids, with the solid material and liquid being stored or collected in separate locations for post-treatment. Under these conditions, the post-treatment is convenient and easily done.

What we claim is:

1. A liquid and solid material handling structure comprising: an elongated floor adapted to accommodate liquid and solid materials, said floor having a first end and a second end, means located below said floor having an elongated chamber extended in the direction of said floor, said floor having a longitudinal slit open to said chamber allowing liquid on the floor to drain into said chamber, means located adjacent the first end of the floor to receive solid material moved from the floor, means located adjacent the second end of the floor to receive liquid from the chamber, a frame movably supported on the floor, scraper means connected to the frame, said scraper means movable to a first position adjacent the floor to move solid material located on the floor to the means to receive solid material, and movable from the first position to a second position above the floor, first means connected to the frame and extended through the slit into the chamber, second means located in the chamber movably connected to the first means, said second means movable to a first position to move liquid in the chamber to the means to receive liquid and from the first position to a second position, power means for selectively moving the frame in first and second directions along the length of the floor, said power means selectively operable to move the frame in the first direction along the length of the floor whereby said scraper means moves solid material on the floor to the means to receive solid material and to move the frame in the second direction along the length of the floor whereby said second means moves liquid in the chamber to the means to receive liquid, and connecting means attaching the frame and power means, said connecting means operable to move the scraper means to its second position when the power means moves the frame in the second direction whereby the scraper means does not move solid material on the floor.

2. The structure of claim 1 including: pivot means pivotally connecting the scraper means to the frame whereby the scraper means pivots between the first and second positions.

3. The structure of claim 1 wherein: the first means is a plate extended downwardly through said slit into the chamber.

4. The structure of claim 1 wherein: the second means is a plate pivotally mounted on the first means.

5. The structure of claim 1 wherein: the first means is a first plate secured to a mid-section of the frame and extended downwardly through the slit into the chamber, said second means is a second plate located in the chamber, and means pivotally connecting the second plate to the first plate.

6. The structure of claim 1 wherein: the connecting means includes guide means mounted on the frame, a movable member mounted on the guide means, and means on the movable member for limiting the movement of the movable member relative to the guide means, said connecting means being engageable with the scraper means to move the scraper means to its second position.

7. The structure of claim 1 wherein: the scraper means has a blade, said blade having forwardly converging edges adapted to engage the floor.

8. An apparatus useable with an elongated floor for accommodating liquid and solid material, a way having a chamber located below the floor and extended along the length of the floor, said floor having a longitudinal slit open to the chamber allowing liquid on the floor to drain into the chamber, means for receiving solid material from the floor, and means for receiving liquid from the chamber, for removing solid material from the floor and depositing the solid material into the means for receiving solid material and moving liquid in the chamber to the means for receiving liquid comprising: a frame adapted to be movably supported on the floor, scraper means connected to the frame for moving solid material located on the floor into the means for receiving solid material, first means connected to the frame adapted to extend through the slit into the chamber, second means locatable in the chamber movably connected to the first means for moving liquid in the chamber into the means for receiving liquid, means for selectively moving the frame in first and second directions along the length of the floor, said frame movable along the length of the floor whereby said scraper means moves solid material on the floor into the means for receiving solid material and movable along the length of the floor whereby said second means moves liquid in the chamber into the means for receiving liquid.

9. The apparatus of claim 8 including: pivot means pivotally connecting the scraper means to the frame whereby the scraper means pivots relative to the frame and floor.

10. The apparatus of claim 8 wherein: the first means is a plate adapted to extend downwardly through said slit into the chamber.

11. The apparatus of claim 8 wherein: the second means is a plate pivotally mounted on the first means.

12. The apparatus of claim 8 wherein: the first means is a first plate secured to a mid-section of the frame adapted to extend downwardly through the slit into the chamber, said second means is a second plate locatable in the chamber, and means pivotally connecting the second plate to the first plate.

13. The apparatus of claim 8 wherein: the means for selectively moving the frame includes power means and connecting means operably connecting the power means with the frame, said connecting means including guide means mounted on the frame, a movable member mounted on the guide means, and means on the movable member for limiting the movement of the movable member relative to the guide means.

14. The apparatus of claim 8 including: means adapted to movably mount the scraper means on the floor, said means for selectively moving the frame being engageable with the scraper means to move the scraper means away from the floor when the frame is moved in the second direction.

15. In combination, an elongated floor having first and second ends for accommodating solid material and liquid, as animal wastes, between said first and second ends, solid material receiving means located adjacent the first end of the floor for receiving solid material from the floor, an elongated way having a chamber located below said floor, liquid receiving means located adjacent the second end of the floor for receiving liquid from the chamber, slit means through the floor open to the chamber whereby liquid on the floor flows into the chamber, said slit means extended along the length of the chamber, a frame movably supported on the floor, scraper means connected to the frame for moving solid material located on the floor into the solid material receiving mean on movement of the frame relative to the floor toward the solid material receiving means, liquid moving means located in the chamber connected to the frame for moving liquid in the chamber into the liquid receiving means on movement of the frame relative to the floor toward the liquid receiving means, and means for selectively moving the frame in opposite directions relative to the floor.

16. The structure of claim 15 wherein: the floor has two longitudinal floor sections that slope downwardly toward each other, said slit means being located between adjacent portions of the floor sections.

17. The structure of claim 16 wherein: said scraper means has a blade, said blade having forward converging edges engageable with the floor sections.

18. The structure of claim 15 including: means mounting the scraper means on the frame for movement to a first position adjacent the floor and a second position above the floor, said means for selectively moving the frame means including means for moving the scraper means to its second position on movement of the scraper means relative to the floor toward the liquid receiving means.

19. The structure of claim 15 including: means mounting the scraper means on the frame for movement to a first position adjacent the floor and a second position above the floor, said means for selectively moving the frame includes power means and connecting means operably connecting the power means with the frame, said connecting means including guide means mounted on the frame, a movable member mounted on the guide means, and means on the movable member for limiting the movement of the movable member relative to the guide means, said connecting means being engageable with the scraper means to move the scraper means to its second position.

20. The structure of claim 15 wherein: said liquid moving means includes first means connected to the frame and extended through the slit into the chamber, and second means located in the chamber movably connected to the first means for moving the liquid in the chamber on movement of the frame toward the liquid receiving means.

21. The structure of claim 20 wherein: the first means is a plate extended downwardly through said slit means.

22. The structure of claim 20 wherein: the second means is a plate pivotally mounted on the first means.

23. The structure of claim 20 wherein: the first means is a first plate secured to a mid-section of the frame and extended downwardly through the slit into the chamber, said second means is a second plate located in the chamber, and means pivotally connecting the second plate to the first plate.

24. The structure of claim 23 including: means mounting the scraper means on the frame for movement to a first position adjacent the floor and a second position above the floor, said means for selectively moving the frame includes power means and connecting means operably connecting the power means with the frame, said connecting means including guide means mounted on the frame, a movable member mounted on the guide means, and means on the movable member for limiting the movement of the movable member relative to the guide means, said connecting means being engageable with the scraper means to move the scraper means to its second position.

* * * * *